United States Patent
Kuenstel et al.

(10) Patent No.: US 11,125,366 B2
(45) Date of Patent: Sep. 21, 2021

(54) HOSE END FITTING

(71) Applicant: Eaton Intelligent Power Limited, Dublin (IE)

(72) Inventors: Christian Kuenstel, Baden-Baden (DE); Juergen Schmidt, Rastatt (DE); Peter Ernst, Rheinmuenster (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 200 days.

(21) Appl. No.: 16/339,388

(22) PCT Filed: Oct. 4, 2017

(86) PCT No.: PCT/EP2017/075213
§ 371 (c)(1),
(2) Date: Apr. 4, 2019

(87) PCT Pub. No.: WO2018/065462
PCT Pub. Date: Apr. 12, 2018

(65) Prior Publication Data
US 2020/0041052 A1    Feb. 6, 2020

(30) Foreign Application Priority Data
Oct. 6, 2016 (GB) ........................... 1616951

(51) Int. Cl.
*F16L 33/207*    (2006.01)
(52) U.S. Cl.
CPC .................. *F16L 33/2078* (2013.01)

(58) Field of Classification Search
CPC ........................ F16L 33/2071; F16L 33/2078
(Continued)

(56) References Cited

U.S. PATENT DOCUMENTS 2,341,003 A * 2/1944 Watson ............... F16L 33/2076
285/256
2,401,921 A * 6/1946 Fisher .................... F16L 33/01
285/256
(Continued)

FOREIGN PATENT DOCUMENTS

CN      104791560 A     7/2015
DE         4329650 A1 *  3/1995 .......... F16L 33/2078
(Continued)

*Primary Examiner* — David Bochna
(74) *Attorney, Agent, or Firm* — Leydig, Voit & Mayer, Ltd.

(57) ABSTRACT

A hose end fitting includes: a body with a continuous channel extending through the body from a first end of the body to a second end of the body, a circumferential groove being arranged around the first end of the body, the first end of the body arranged for receiving an end of a hose, and a coupling device being arranged on the second end of the body; a retaining ring having a radially inwardly extending circumferential rib and a circumferential groove arranged in an outer circumferential surface of the ring; and a socket crimpable on to the retaining ring, the socket having on one end an inwardly extending flange for engagement with the circumferential groove on the retaining ring. The retaining ring has a slit extending in an axial direction allowing for the retaining ring to bend open and accordingly expand, such that the ring is slidable.

8 Claims, 2 Drawing Sheets

(58) Field of Classification Search
USPC .......................................................... 285/256
See application file for complete search history.

(56) References Cited

U.S. PATENT DOCUMENTS

| | | | | |
|---|---|---|---|---|
| 2,583,956 | A * | 1/1952 | Lindsay | .................. F16L 33/26 |
| | | | | 285/222.5 |
| 4,548,430 | A * | 10/1985 | Haubert | .............. F16L 33/2078 |
| | | | | 285/256 |
| 4,733,890 | A * | 3/1988 | Vyse | .................. F16L 33/2076 |
| | | | | 285/136.1 |
| 5,829,795 | A * | 11/1998 | Riesselmann | ....... F16L 33/2078 |
| | | | | 285/256 |
| 7,293,804 | B2 | 11/2007 | Li et al. | |
| 7,384,074 | B2 * | 6/2008 | He | ...................... F16L 33/2078 |
| | | | | 285/242 |
| 8,783,732 | B2 * | 7/2014 | Smith | ................. F16L 33/2073 |
| | | | | 285/259 |
| 10,539,258 | B2 * | 1/2020 | Wells | .................. F16L 33/2073 |
| 2003/0001385 | A1 * | 1/2003 | Favre | .................. F16L 33/2076 |
| | | | | 285/256 |
| 2004/0104572 | A1 * | 6/2004 | Gilbreath | ............ F16L 33/2078 |
| | | | | 285/256 |
| 2012/0160536 | A1 * | 6/2012 | Beining | .............. F16L 33/2078 |
| | | | | 174/47 |
| 2019/0186664 | A1 * | 6/2019 | Miller | ................. F16L 33/2078 |

FOREIGN PATENT DOCUMENTS

| | | |
|---|---|---|
| DE | 4329650 A1 | 3/1995 |
| DE | 202005008109 U1 | 8/2005 |
| DE | 102008031418 A1 | 1/2010 |
| EP | 0067063 A1 | 12/1982 |
| EP | 1126206 A1 | 8/2001 |
| JP | 2008157313 A | 7/2008 |

* cited by examiner

HOSE END FITTING

CROSS-REFERENCE TO PRIOR APPLICATIONS

This application is a U.S. National Phase application under 35 U.S.C. § 371 of International Application No. PCT/EP2017/075213, filed on Oct. 4, 2017, and claims benefit to British Patent Application No. GB 1616951.8, filed on Oct. 6, 2016. The International Application was published in English on Apr. 12, 2018 as WO 2018/065462 under PCT Article 21(2).

FIELD

The invention relates to a hose end fitting having a body and a retaining ring.

BACKGROUND

Such a hose end fitting is for example known from DE 43296501 or EP 0067063. In the hose end fitting known from EP 0067063, also a body, retaining ring and socket are provided. The retaining can be slid freely over the first end of the body and be aligned with the circumferential groove in the first end of the body. The retaining ring is in contact with a shoulder on the body to prevent the retaining ring from sliding further over the first end.

Then the socket is also slid over the first end of the body and over the retaining ring. Then the socket is crimped at one end, such that the edge of the socket is pressed into a circumferential groove in the retaining ring and such that at the same time the retaining ring is pressed with an inwardly extending rib into the circumferential groove in the first end of the body.

A disadvantage of this known hose end fitting is that both the retaining ring and the socket need to be positioned correctly, while crimping the socket. Furthermore, the body needs to be provided with a shoulder against which the retaining ring can be positioned in axial direction. As a result manufacturing of the body is more complex, as it typically would require some machining operations after cold forging the body.

SUMMARY

In an embodiment, the present invention provides a hose end fitting, comprising: a body with a continuous channel extending through the body from a first end of the body to a second end of the body, a circumferential groove being arranged around the first end of the body, the first end of the body being configured to receive an end of a hose, and a coupling device being arranged on the second end of the body; a retaining ring having a radially inwardly extending circumferential rib and a circumferential groove arranged in an outer circumferential surface of the ring; and a socket crimpable on to the retaining ring, the socket having on one end an inwardly extending flange configured to engage with the circumferential groove on the retaining ring, wherein the retaining ring has a slit extending in an axial direction allowing for the retaining ring to bend open and accordingly expand, such that the ring is slidable over the first end of the body, and wherein the inwardly extending circumferential rib at least partially extends into the circumferential groove arranged in the first end of the body, at least when the socket is in an undeformed state, in order to lock axial relative movement between the retaining ring and the body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
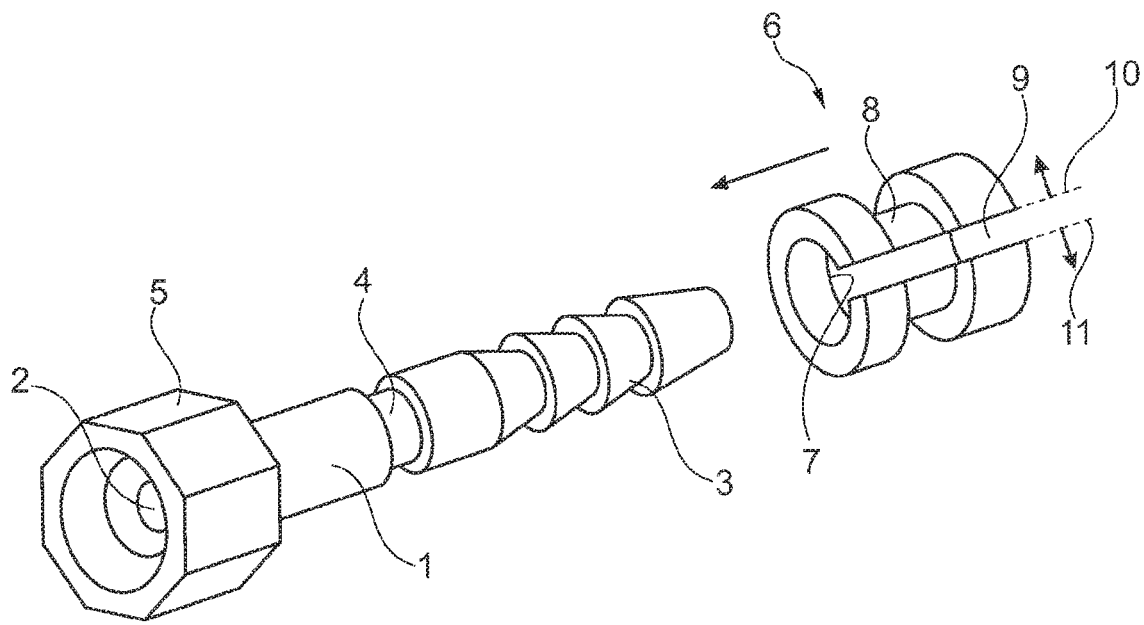
FIGS. 1-3 show different steps of an embodiment of the method according to the invention.

Embodiments of the present invention reduce or eliminate disadvantages of the prior art. Embodiments of the invention provide a hose end fitting with a retaining ring having a slit extending in an axial direction.

Using a retaining ring having a slit, allows for the retaining ring to bend open and accordingly expand, such that the ring can be slid over the first end of the body. When the retaining ring is aligned with the circumferential groove in the first end of the body, the retaining ring can be snapped into place, wherein the inwardly extending rib is in engagement with the circumferential groove in the body preventing the retaining ring to slide in either axial direction.

Accordingly, the socket can be positioned without any attention for the positioning of the retaining ring and the socket can be crimped without the need to maintain the retaining ring aligned. Furthermore, due to the design of the retaining clip, the socket can be manufactured in a machining process or in a deep drawn process.

When the socket is crimped and the flange of the socket is in engagement with the circumferential groove on the retaining ring, the retaining ring can no longer expand ensuring a reliable mounting of both retaining ring and socket on to the body.

In a preferred embodiment of the hose end fitting according to the invention the two ends of the retaining ring bordering the slit are spaced apart to allow for relative movement of the two ends in tangential direction.

As a result the retaining ring can expand in radial direction because the two ends bordering the slit can move away from each other in tangential direction.

Preferably, the retaining ring is of a plastic, such as poly amid. A plastic ring can easily be provided with a slit and typically provides sufficient elasticity to expand the ring and snap it into the circumferential groove on the first end of the body. Furthermore, plastics can provide sufficient strength to withstand the crimp force of the socket on to the retaining ring.

With the invention, the inwardly extending circumferential rib extends at least partially into the circumferential groove arranged in the first end of the body, at least when the socket is in undeformed state, in order to lock axial relative movement between the retaining ring and the body.

By having the circumferential rib extending at least partially into the circumferential groove ensures that after snapping the retaining ring into position, the retaining ring cannot shift in axial direction and the position of the ring is thus ensured. This allows one to concentrate on the correct positioning of the socket when crimping the socket onto the retaining ring.

Preferably, the first end of the body is cylindrical. A cylindrical first end of the body facilitates mounting a hose on the first end. Other shapes could also be used for first end of the body, but this might require additional effort for mounting a hose on the first end.

The invention also relates to a method for providing a hose end fitting, which method comprises the steps of:
- providing a body with a continuous channel extending through the body from a first end of the body to a second end of the body, wherein a circumferential groove is arranged around the first end of the body, wherein the first end of the body is arranged to receive an end of a hose and wherein a coupling device, such as a thread or a union nut, is arranged on the second end of the body;
- providing a retaining ring having a radially inwardly extending circumferential rib and a circumferential groove arranged in the outer circumferential surface of the ring, wherein the retaining ring has a slit extending in axial direction;
- sliding the retaining ring over the first end of the body, while expanding the retaining ring and snapping the retaining ring with the inwardly extending circumferential rib into the circumferential groove in the first end of the body;
- providing a socket having on one end an inwardly extending flange for engagement with the circumferential groove on the retaining ring;
- crimping the socket on to the retaining ring, wherein the inwardly extending flange is pressed into the circumferential groove on the retaining ring.

In FIG. 1 a body 1 with a continuous channel 2 is provided. The first end of the body 1 is provided with a saw-tooth profile 3 over which the end of a hose can be arranged. The saw-tooth profile 3 contributes in maintaining the end of a hose on to the body 1. The first end of the body 1 also comprises a circumferential groove 4.

The second end of the body 1 is provided with a union nut 5 with which the hose end fitting can be screwed onto a component, such as a compressor or an evaporator.

In the first step shown in FIG. 1, a retaining ring 6 is also provided. The retaining ring 6 has on the inner surface an inwardly extending rib 7 and has on the outer surface a circumferential groove 8.

The retaining ring 6 has a slit 9 extending in axial direction of the retaining ring 6. The ends 10, 11 of the retaining ring 6 bordering the slit 9 are pulled apart to expand the retaining ring 6 and allow it to slide over the first end of the body 1.

Figure 2:
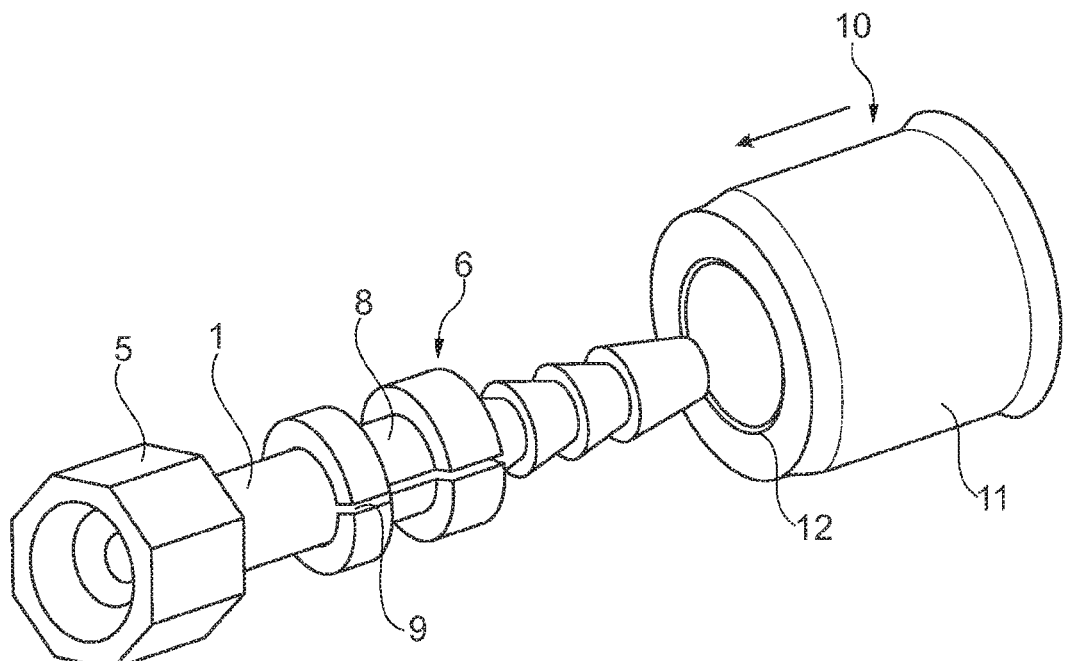

In FIG. 2 the retaining ring 6 is slid over the first end of the body 1, such that the inwardly extending rib 7 is aligned with the circumferential groove 4 in the body 1 and the retaining ring 6 is allowed to return to its original shape closing the slid 9 and snapping the rib 7 into engagement with the groove 4. This ensures that the retaining ring 6 can no longer slide in axial direction relative to the body 1.

In FIG. 2 a socket 10 is provided. This socket 10 has a cylindrical body 11 with on one end an inwardly extending flange 12. The socket 10 is also slid over the first end of the body 1, such that the inwardly extending flange 12 is aligned with the circumferential groove 8 on the retaining ring 6 (see also FIG. 4).

The end 13 of the socket 10 with the inwardly extending rib 12 is then crimped to push the rib 12 into the groove 8 fixing the socket on the retaining ring 6 and further closing the slit 9 of the retaining ring. The remaining part of the cylindrical body 11 remains undeformed, such that the end 14 of a hose can be inserted into the socket 10 and over the saw-tooth profile 3 of the first end of the body 1, after which the full socket 10 is crimped to clamp the hose end 14. This is similar to the attachment of hose ends to known hose end fittings.

Figure 3:
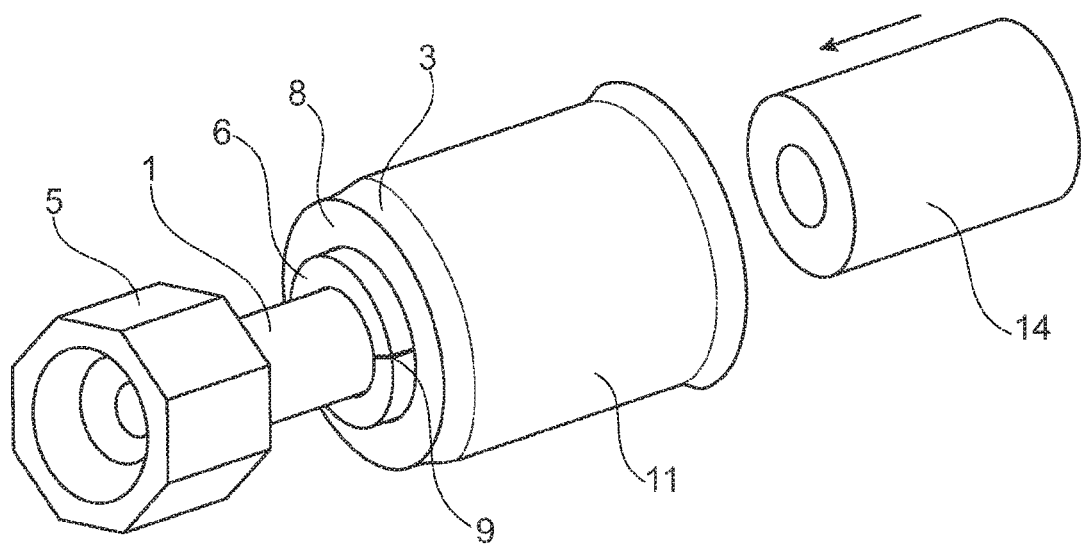
Figure 4:
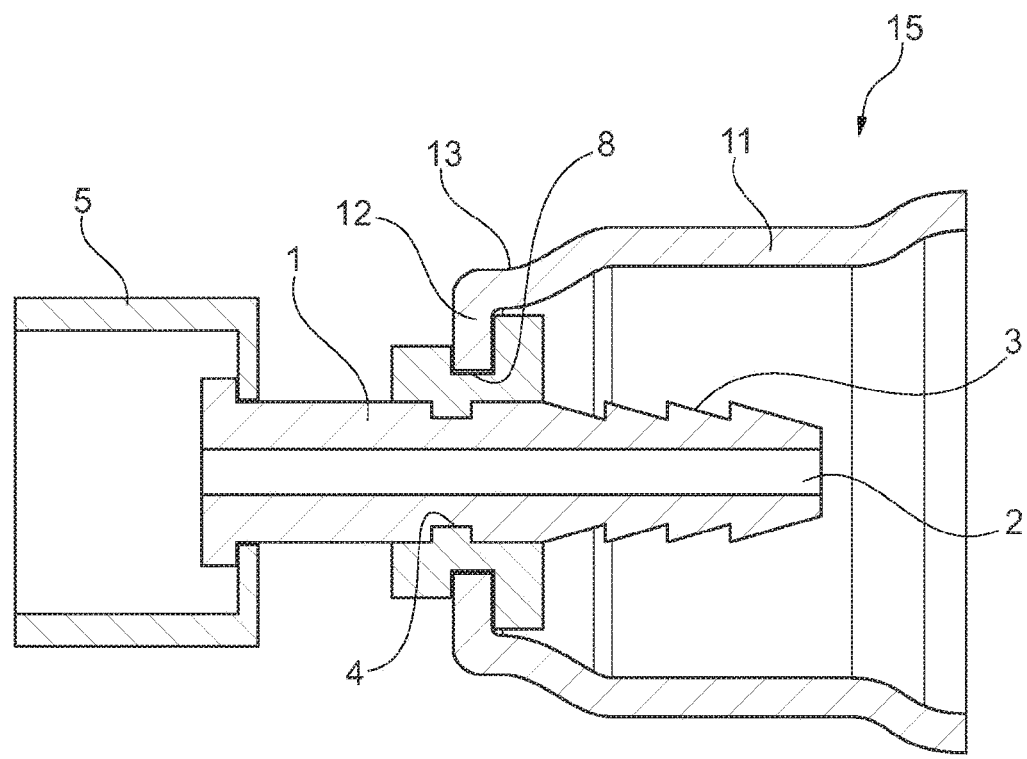
FIG. 4 shows a cross-sectional view of an embodiment of a hose end fitting according to the invention.

FIG. 4 shows a cross-sectional view of an embodiment 15 of the hose end fitting manufactured according to the method shown in FIGS. 1-3.

As is clear from FIG. 4, the hose end fitting 15 has a cylindrical body 1 with continuous channel 2. The body 1 does not vary much in diameter along the length. This allows for low cost manufacturing of the body, as no complex machining is required.

The separate retaining ring 6, can be manufactured low costs, for example by injection moulding. The separate retaining ring 6 allows for the cylindrical body 1 also to be used for different embodiments, for example, where the socket is crimped directly onto the body 1 or wherein a different hose connection is provided. So, with the embodiment according to the invention the different parts of the hose end fitting can be applied more diversely reducing manufacturing and storage costs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A hose end fitting, comprising:
   a body with a continuous channel extending through the body from a first end of the body to a second end of the body, a circumferential groove being arranged around the first end of the body, the first end of the body being configured to receive an end of a hose, and a coupling device being arranged on the second end of the body;
   a retaining ring having a radially inwardly extending circumferential rib and a circumferential groove arranged in an outer circumferential surface of the ring; and a socket crimpable on to the retaining ring, the socket having on one end an inwardly extending flange configured to engage with the circumferential groove on the retaining ring, wherein the retaining ring has a slit extending in an axial direction allowing for the retaining ring to bend open and accordingly expand, such that the ring is slidable over the first end of the body, wherein the inwardly extending circumferential rib at least partially extends into the circumferential groove arranged in the first end of the body, at least when the socket is in an undeformed state, in order to lock axial relative movement between the retaining ring and the body, and wherein portions of the retaining ring to either side of the circumferential groove of the retaining ring extend different lengths in the radial direction.

2. The hose end fitting according to claim 1, wherein the two ends of the retaining ring bordering the slit are spaced apart to allow for relative movement of the two ends in a tangential direction.

3. The hose end fitting according to claim 1, wherein the retaining ring is comprised of a plastic.

4. The hose end fitting according to claim 3, wherein the plastic comprises polyamid.

5. The hose end fitting according to claim 1, wherein the first end of the body is cylindrical.

6. A method for providing the hose end fitting according to claim 1, which method comprises the steps of:

providing the body with the continuous channel extending through the body from the first end of the body to the second end of the body, the circumferential groove being arranged around the first end of the body, the first end of the body being configured to receive the end of the hose, and a coupling device being arranged on the second end of the body;

providing the retaining ring having the radially inwardly extending circumferential rib and the circumferential groove arranged in the outer circumferential surface of the ring, the retaining ring having the slit extending in the axial direction;

sliding the retaining ring over the first end of the body, while expanding the retaining ring and snapping the retaining ring with the inwardly extending circumferential rib into the circumferential groove in the first end of the body;

providing the socket having on one end the inwardly extending flange configured to engage with the circumferential groove on the retaining ring; and crimping the socket on to the retaining ring, the inwardly extending flange being pressed into the circumferential groove on the retaining ring.

7. The method according to claim 6, wherein the coupling device comprises a thread or a union nut.

8. The hose end fitting according to claim 1, wherein the coupling device comprises a thread or a union nut.

* * * * *